(12) United States Patent
Colbeck et al.

(10) Patent No.: US 8,682,850 B2
(45) Date of Patent: Mar. 25, 2014

(54) METHOD OF ENHANCING DE-DUPLICATION IMPACT BY PREFERENTIAL SELECTION OF MASTER COPY TO BE RETAINED

(75) Inventors: Scott J. Colbeck, San Jose, CA (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 12/137,400

(22) Filed: Jun. 11, 2008

(65) Prior Publication Data

US 2009/0313312 A1 Dec. 17, 2009

(51) Int. Cl.
*G06F 7/00* (2006.01)
*G06F 17/00* (2006.01)
*G06F 17/30* (2006.01)

(52) U.S. Cl.
USPC ............................ 707/637; 707/638; 707/692

(58) Field of Classification Search
USPC ................... 711/216, 154; 715/513; 707/204; 398/98; 717/125; 703/20
See application file for complete search history.

(56) References Cited

U.S. PATENT DOCUMENTS

| | | | |
|---|---|---|---|
| 5,628,004 A | 5/1997 | Gormley et al. | |
| 7,181,578 B1 * | 2/2007 | Guha et al. | 711/154 |
| 7,950,004 B2 * | 5/2011 | Vieira et al. | 717/125 |
| 8,229,726 B1 * | 7/2012 | Magdon-Ismail et al. | 703/20 |
| 2003/0018878 A1 * | 1/2003 | Dorward et al. | 711/216 |
| 2003/0128987 A1 * | 7/2003 | Mayer | 398/98 |
| 2004/0128618 A1 * | 7/2004 | Datta | 715/513 |
| 2004/0153458 A1 * | 8/2004 | Noble et al. | 707/10 |
| 2007/0038857 A1 * | 2/2007 | Gosnell | 713/165 |
| 2007/0103984 A1 * | 5/2007 | Kavuri et al. | 365/185.17 |
| 2008/0104146 A1 * | 5/2008 | Schwaab et al. | 707/204 |
| 2009/0193210 A1 * | 7/2009 | Hewett et al. | 711/163 |

* cited by examiner

*Primary Examiner* — Susan Chen
(74) *Attorney, Agent, or Firm* — Lieberman & Brandsdorfer, LLC

(57) ABSTRACT

A method and apparatus are provided for enhancing the impact of data de-duplication by preferential selection of the master copy to be retained based on current loads and performance metrics of the storage media devices. The computer system is configured to take as input the identified duplicate copies of data and evaluating their locations in storage devices to determine the cumulative affects of retaining one of the identified duplicate copies as a master copy and optionally allocating a new location if needed. Once a master copy has been designated, the remaining identified duplicate copies are removed from storage.

20 Claims, 7 Drawing Sheets

METHOD OF ENHANCING DE-DUPLICATION IMPACT BY PREFERENTIAL SELECTION OF MASTER COPY TO BE RETAINED

BACKGROUND OF THE INVENTION

1. Technical Field

This invention relates to de-duplication of data items in storage media devices. More specifically, the invention relates to enhancing the impact of data de-duplication by preferential selection of item(s) to be retained based upon the current loads and performance metrics of the devices.

2. Description of the Prior Art

A computer is a programmable machine that responds to a specific set of instructions in a well defined manner, and executes a list of instructions, also known as a program. Computers generally include the following hardware components: memory, storage, input device, output device, and a central processing unit. There are various techniques and devices known in the art for storing large amounts of data. Examples of storage devices include, but are not limited to, hard disks, optical disks, tapes, etc. In a networked computer system, it is known to group two or more storage devices into a storage area network or a mass storage device. A storage area network is a high speed sub-network of shared storage devices, wherein each storage device is a machine that contains one or more disks or storage devices. In one embodiment, a storage area network allows all storage devices to be available to all servers on a local or wide area network. The data resides on the storage devices and not the servers. This configuration of storage devices with respect to servers releases network capacity to the end user.

It is known in the art of storage technology for multiple copies of the redundant data to be stored on one or more storage devices in a storage area network. The redundant copies of data are also known as duplicate data. Recent developments in the art have encouraged removal of duplicate copies of data to make room available for non-duplicate copies of data on the storage device(s). In storage technology, de-duplication refers to the elimination of redundant data. More specifically, the process of de-duplication deletes duplicate data leaving only one copy of the data to be stored on storage media. At the same time, de-duplication retains indexing of all data retained, should that data ever be required. Accordingly, de-duplication is able to reduce the required storage capacity since only one copy of the unique data is stored.

FIG. 1 is a flow chart (100) illustrating a prior art de-duplication process. A hash function is computed for each data item retained on the storage device (102), also known as an existing data item. A data item, D, is selected (104). All data items that have the same hash value as D are found (106). The data items found at step (106) are considered duplicates of D. The set S(D) is selected as a set of data items that have the same hash value as D (108). Following the creation of the set at step (108), it is determined whether the set includes more than one data item (110). A negative response to the determination at step (110) is followed by marking data item D as processed (112) and determining whether there are other unprocessed data items (114). A positive response to the determination at step (114) is followed by selection of the next unprocessed data item (116) and a return to step (106). In contrast, a negative response to the determination at step (114) is an indication that all of the data items have been identified and processed (118). Similarly, if the response to the determination at step (110) is positive, any one of the data items from the set is selected and retained in storage, with the other identified copies in the set removed from storage (120). Accordingly, the prior art solutions for selection of identified duplication copies does not include an evaluation of the copies to determine an optimal copy to retain.

Once the duplicate copies of data have been removed, a single copy of the data remains on storage media. Each server that needs access to that data will have to retrieve that data from the lone storage media that stores that data. However, different storage media devices are known to have different access rates and may have different current loads. The prior art de-duplication process does not address access rates or the current loads of the storage media devices. Rather, the prior art is restricted to retaining a single copy of data items, and removal of duplicate copies. Accordingly, there is a need to evaluate the current loads and other characteristics of the storage media devices before deciding which copy of the multiple copies of data should be retained on which storage media in the storage area network.

SUMMARY OF THE INVENTION

This invention comprises a method and system for selecting which copy of the multiple duplicate copies to be retained based on the current loads and capabilities of the different storage media devices. The method is complementary and can be used alongside any duplicate identification mechanism to enhance the impact of de-duplication.

In one aspect of the invention, a method is provided for managing duplicate copies of data. Initially, all duplicate copies of data in a storage system are identified. Following the identification process, a single copy of the identified duplicate copies is selected to be retained as a master copy on a select storage device. The identification process includes interfacing with a dynamic storage management tool to obtain a cumulative demand for all of the identified duplicate copies and performance utilization of each of the identified duplicate copies.

In another aspect of the invention, a computer system is provided with a processor in communication with memory, and at least two storage pools in communication with the processor. A storage management tool is provided to identify all duplicate copies of data in the storage pools. In addition, a duplicate manager is provided in communication with the storage management tool. The storage management tool obtains a cumulative demand for all of the identified duplicate copies and performance utilization of each of the identified duplicate copies. In response to the data obtained from the storage management tool, the duplicate manager functions to retain a single copy of the identified duplicate copies as a master copy on a select storage device.

In yet another aspect of the invention, an article is provided with a computer readable carrier including computer program instructions configured to manage duplicate copies of data. Instructions are provided to identify all duplicate copies of data in a storage system. Responsive to the identified duplicate copies of data, instructions are provided to retain a single copy of the identified duplicate copies as a master copy on a select storage device. The instructions to retain a single copy include interfacing with a dynamic storage management tool to obtain a cumulative demand for all of the identified duplicate copies and performance utilization of each of the identified duplicate copies.

Other features and advantages of this invention will become apparent from the following detailed description of the presently preferred embodiment of the invention, taken in conjunction with the accompanying drawings.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiment of the invention will be best understood by reference to the drawings, wherein like part are designated by like numerals throughout. The following description is intended only by way of example, and simply illustrates certain select embodiments of devices, systems, and processes that are consistent with the invention as claimed herein.

Overview

The method, apparatus, and article of manufacture of the present invention provides valuable advantage over the prior art. According to the present invention, a data de-duplication process or mechanism is employed to identify redundant copies of data on storage media. A de-duplication identifier engine analyzes data content and determines duplicate items in storage media. An engine is employed to select one of the duplicate copies to be retained as a master copy of the duplicate data. The remaining duplicate copies are removed from the storage media.

Technical Details

In the following description, reference is made to the accompanying drawings that form a part hereof, and which is shown by way of illustration that specific embodiment in which the invention may be practiced. It is to be understood that other embodiments may be utilized because structural changes may be made without departing from the scope of the present invention.

Figure 1:
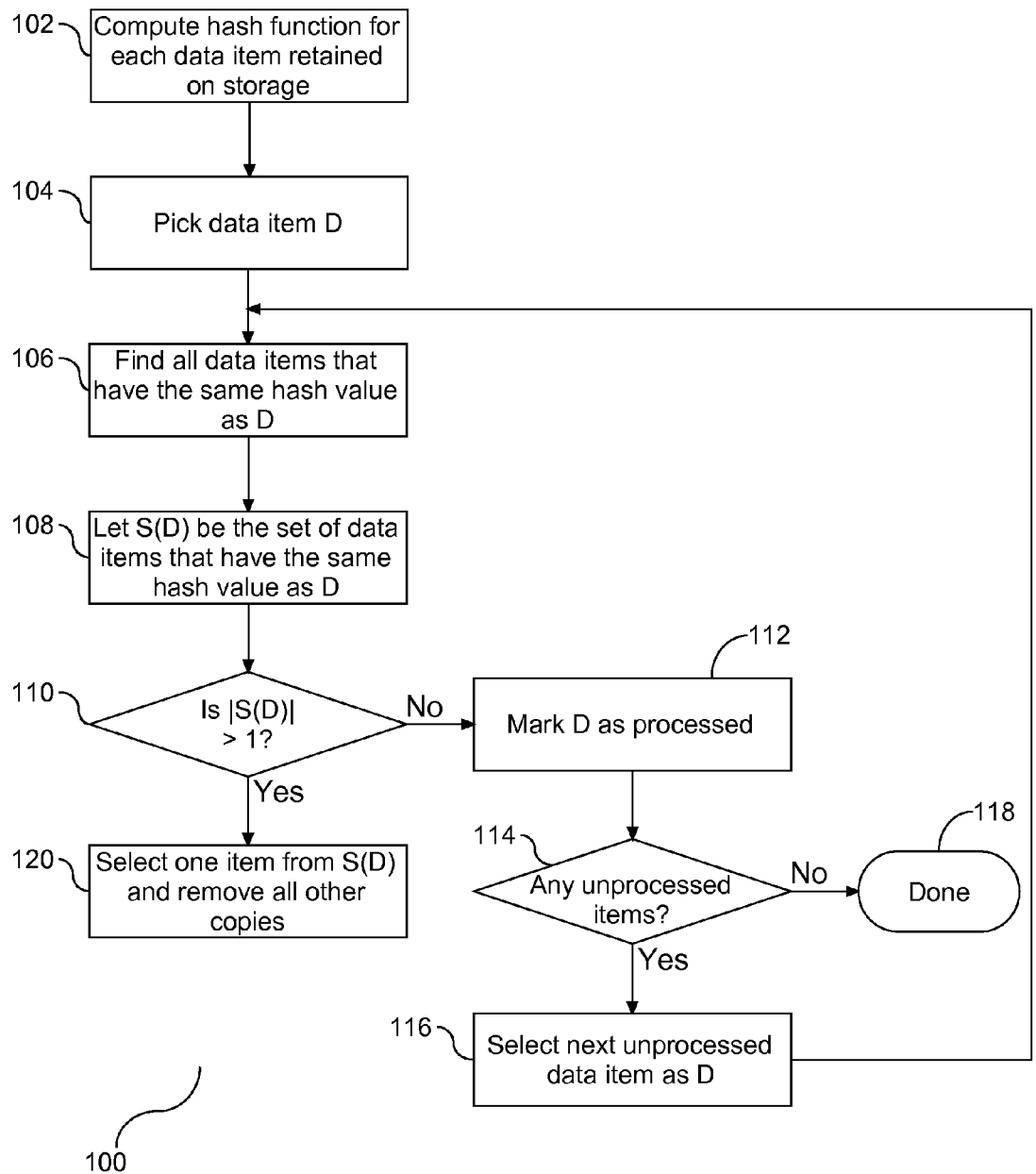
FIG. 1 is a flow chart of a prior art de-duplication process.
Figure 2:
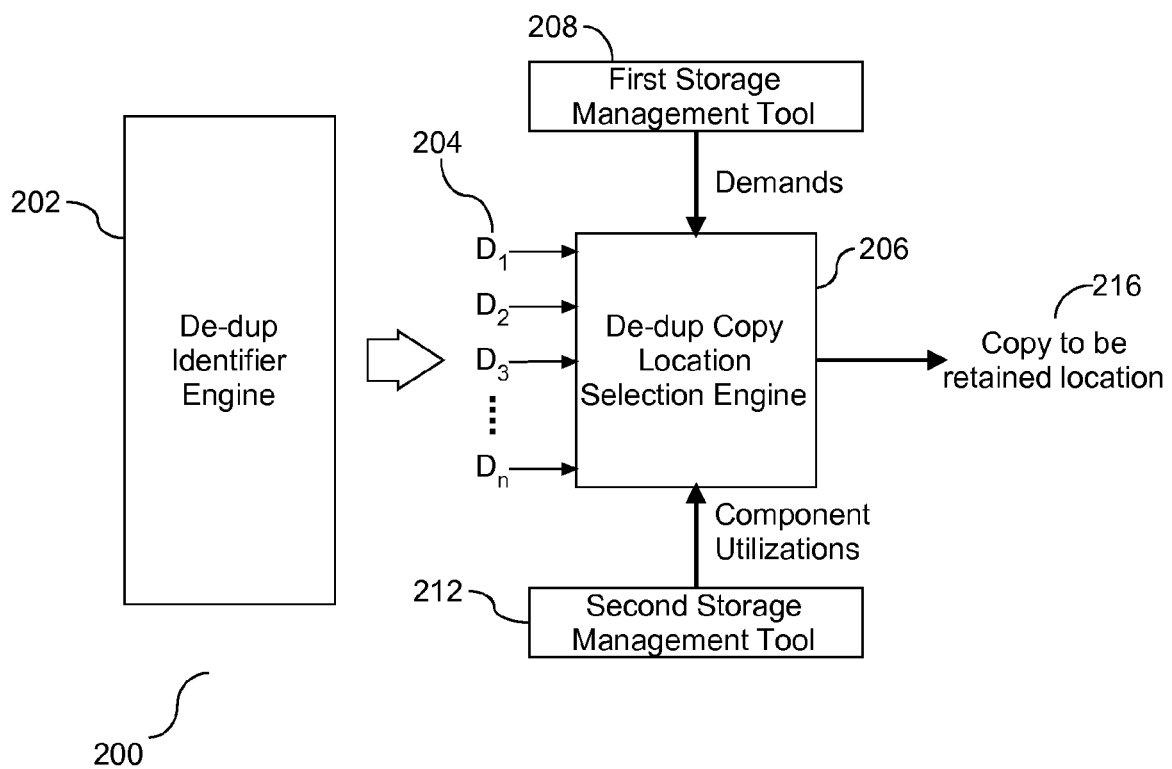
FIG. 2 is block diagram of the tools employed in the data de-duplication and selection process according to the preferred embodiment of this invention, and is suggested for printing on the first page of the issued patent.

FIG. 2 is a block diagram (200) demonstrating the tools employed in the data de-duplication and selection process. As shown, a data de-duplication identifier engine (202) is employed to identify duplicate data items (204) in storage media. In one embodiment, the storage media may be in the form of a storage network with one or more storage devices therein. Although a plurality of duplicate data items (204) are shown, the invention should not be limited to the quantity illustrated herein. Rather, the quantity of identified duplicate data items (204) is merely illustrative. Once the duplicate data items have been identified, a data de-duplication copy location selection engine (206) is employed to determine which copy should be retained as a master copy, and the location where the master copy will be retained. The de-duplication copy location selection engine (206) is in communication with both a first storage management tool (208) and a second storage management tool (212). The first storage management tool (208) functions to analyze the identified redundant copies and their associated demands (210). More specifically, with each redundant copy of data there is a concern with the quantity of access requests, the number of read request, the number of write requests, I/O rate, etc. As shown in detail in FIG. 3 below, these demands are evaluated by the first storage management tool (208). In one embodiment, the first storage management tool executes in the background so that the associated data is available. Data ascertained by the first management tool (208) is communicated to the de-duplication selection engine (206) and is employed as a factor in the master copy determination. Accordingly, the first management tool (208) focuses on evaluating the demands placed on the redundant copies of data.

As shown in FIG. 2, there is a second storage management tool (212). This tool is also in communication with the de-duplication copy location selection engine (206). The second storage management tool (212) evaluates the affect of the duplicate copies of data on the physical storage media. As shown, the second storage management tool (212) functions to evaluate component utilization, which measures the load of the storage media and associated controllers. Storage systems and subsystems have physical components that are affected by a load. The structure and utilization of the storage media components is shown in detail in FIG. 3 below. Accordingly, the second storage management tool (212) focuses on evaluation of the physical components of the storage media in a storage media pool.

Based upon data provided by the first and second storage management tools (208) and (212), respectively, a single master copy is retained at a select location (216). In one embodiment, the storage management tools execute in the background to monitor the storage media, associated storage devices, and volumes in the storage system to ascertain an optimal master copy that can meet the demands placed thereon by the redundant copies to be removed.

Figure 3:
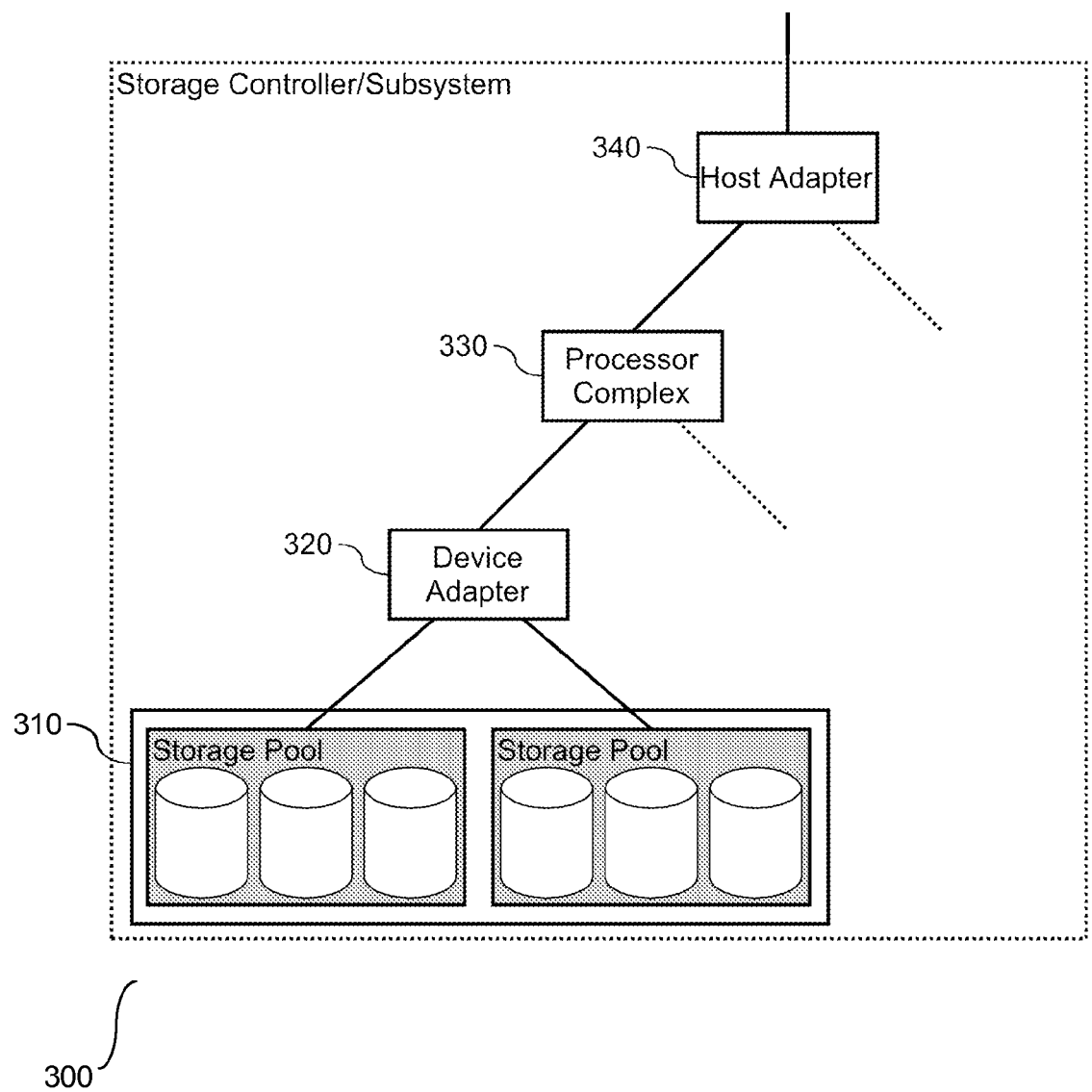
FIG. 3 is a block diagram if the hierarchical structure of the internal components of a storage subsystem.

As noted above, the second storage management tool (212) monitors the pools of storage media and subsystems for each copy of data. Subsystems have multiple levels of internal components that are each individually affected by the system utilization, from which there is a cumulative demand. FIG. 3 is a block diagram (300) of the hierarchical structure of the internal components of a storage subsystem. As shown, there are four tiers (310), (320), (330), and (340). Although only four tiers are described in detail, the invention should not be limited to the quantity of tiers shown and described herein. In one embodiment, the hierarchical structure may include a fewer or greater quantity of tiers, with each tier representing an internal component of the subsystem that is affect by the load of data. The first tier (310) represents the storage pool and the associated controllers thereof. The second tier (320) represents a device adapter. The third tier (330) represents a processor complex. The fourth tier (340) represents a host adapter component of the storage subsystem. Each tier in the hierarchy has an associated workload for each copy of data, and a cumulative workload for all of the copies of data for the associated storage media. Although only four tiers in the hierarchy are shown herein, the invention should not be limited to the quantity of tiers illustrated. In one embodiment, there may be more tiers in the structure, or alternatively, fewer tiers in the structure. However, it should be understood that the tiers identified play a factor in evaluation of load of an identified duplicate data item on an associated storage pool.

Figure 4:
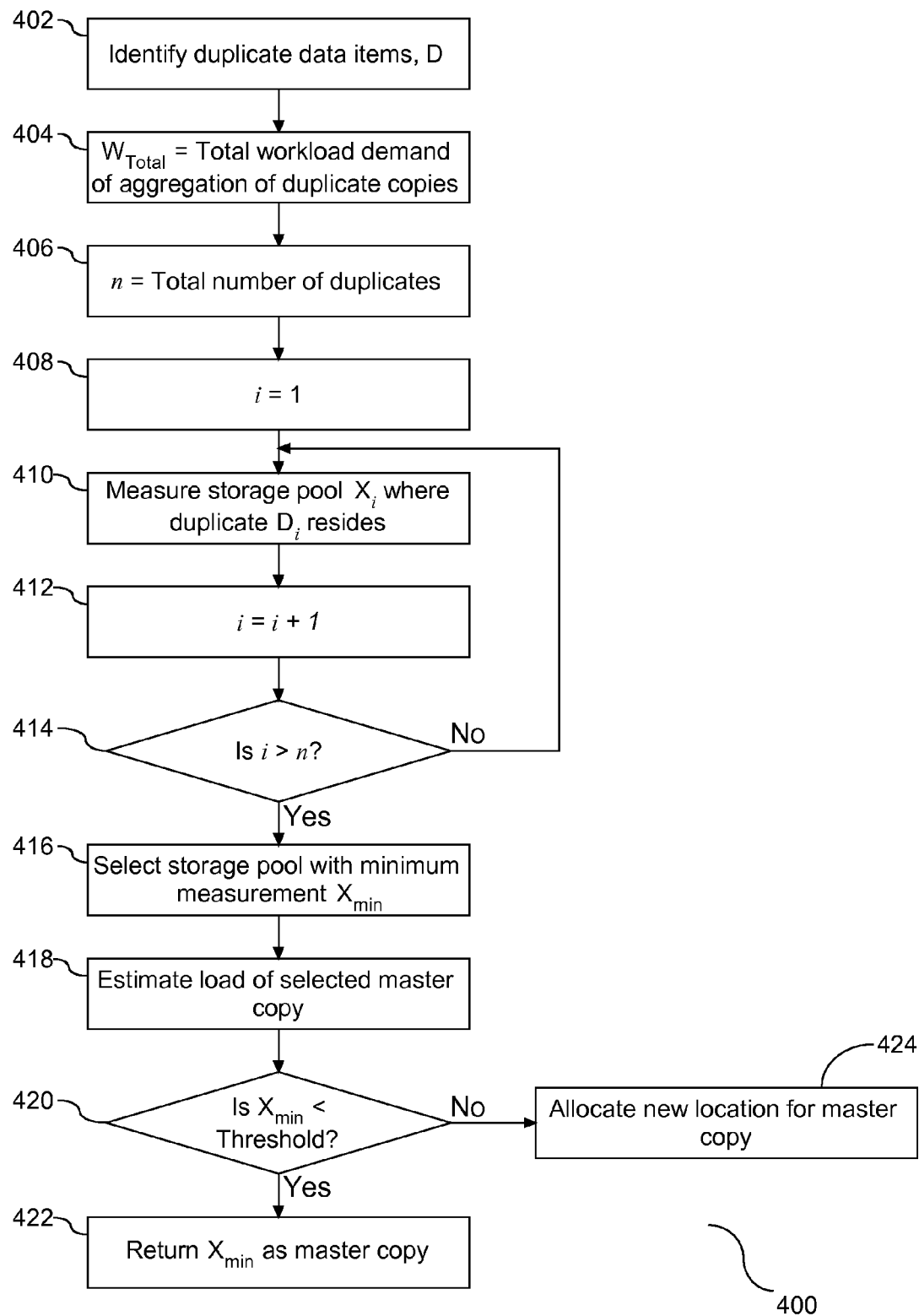
FIG. 4 is a flow chart illustrating a process of selecting a master candidate.

Based upon the identified tiers in the hierarchy, a master candidate is selected from a quantity of two or more identified duplication data items. The non-master candidate(s) for the identified duplication data items are removed from storage following the identification and selection process. FIG. 4 is a flow chart (400) illustrating the process of selecting a master candidate. Initially, the duplicate data items are identified by a de-duplication identifier engine as $D_1, D_2, \ldots D_n$ (402). There are different tools that are available to identify duplicate data items. The invention herein does not address the aspect of the duplicate identification process. Following the duplication identification process at step (402), the variable $W_{Total}$ is employed to denote the total workload of the aggregation of the identified duplicate data items (404). Thereafter, the variable n is employed as a counting variable associated with the total number of identified duplicate data items (406). Initially, the variable i is set to the integer 1 (408). The pool, $X_i$, in the storage controller where each duplicate data item, $D_i$ is residing is measured (410). The measurements at step (410) are shown in detail in FIG. 5. Following the measurement at step (410), the variable i is incremented (412), followed by a determination as to whether the incremented value of i is greater than the quantity of identified duplicate data items n (414). A negative response to the determination at step (414) is followed by a return to step (410). However, a positive response to the determination at step (414) completes the measurement process. Accordingly, the first part in selecting a master candidate from a set of identified duplicate data items is to measure the load on the specified storage pool.

Once all of the measures of all of the storage pools are completed, as outlined in steps (408)-(414), the storage pool with the minimum calculated measurement, i.e. minimum load, is selected as the master copy (416). The selected master copy is identified as $X_{min}$. After a data item has been selected as a master copy, the identified duplicate items are removed from storage. The remaining master copy will receive all of the read requests. Therefore, it is important to measure the affect of the master copy on the storage hierarchy. Following step (416), an estimate of the load of the selected master copy on the storage hierarchy is calculated (418), followed by a determination as to whether the estimate is below a threshold (420) that the storage hierarchy can support. In one embodiment, the threshold is a configurable threshold that is defined by a user. If it is determined that the load of the selected master copy is below the set threshold, the selected master copy is retained as the master copy of the subject duplicate data item (422). In contrast, if it is determined that the load of the selected master copy is above the set threshold, a new copy of the data item is created as a new master copy and a new storage location with a utilization rate below the set threshold is allocated (424). Accordingly, following selection of a master copy, it must be determined if the estimated load on storage hierarchy by the selected master copy can be accommodated.

Figure 5:
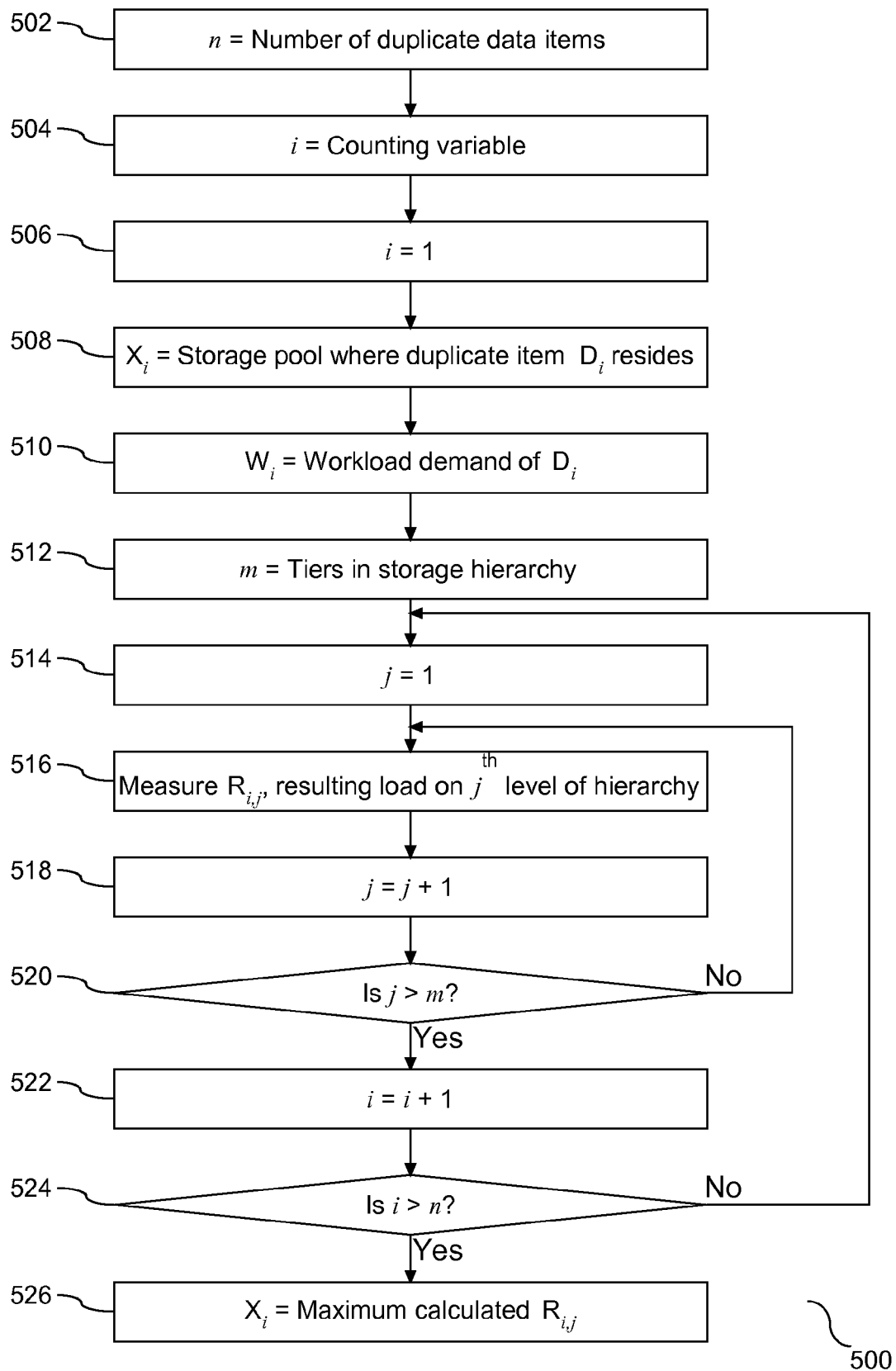
FIG. 5 is a flow chart illustrating a process for measuring the load on the storage pool from the duplicate data items.

FIG. 5 is a flow chart (500) illustrating a process for measuring the load on the storage pool from the duplicate data items. As noted above, the variable n is employed to identify the number of duplicate data items (502), and the variable i is employed as a counting variable (504). Initially, the counting variable i is set to the integer one (506). $X_i$ is identified as the storage pool in a storage hierarchy where duplicate data item, $D_i$, resides (508). $W_i$ is employed to denote the workload demand for duplicate data item $D_i$ (510). In one embodiment, a storage monitoring tool is employed to track the number of read requests for each copy of each duplicate item in each storage pool. Following step (510), the variable $Tier_{i,j}$ is assigned as the internal nodes of the storage hierarchy that occur on the path from the root of the controller to the storage pool, i.e. the tier of the storage hierarchy. An example storage hierarchy is shown in detail in FIG. 3. However, it should be noted that the storage hierarchy is identified in FIG. 3 with four tiers. In one embodiment, the storage hierarchy may include more tiers or fewer tiers, each depending upon the configuration of the storage hierarchy. As defined above, the variable i is a counting variable which cannot exceed the fixed integer n identifying the maximum number of duplicate data items. The variable j represents counting variable for the quantity of tiers m in the storage hierarchy (512). Initially, the variable j is set at integer 1 (514). For each duplicate item and each level in the storage hierarchy, the resulting utilization, R is calculated (516). The resulting utilization is a measurement of the resulting load of each duplicate data item on each level in the storage hierarchy. Following the calculation at step (516) the variable j is incremented (518), followed by a determination as to whether the incremented value of j exceeds the quantity of tiers in the storage hierarchy (520). Details of the calculation of the resulting utilization are outlined and described in FIG. 6. If it is determined that the incremented value of j does not exceed the quantity of tiers in the hierarchy, m, then the process returns to step (516). However, if it is determined that the incremented value of j does exceed the quantity of tiers in the hierarchy, m, than the variable i is incremented (522). Similar to step (520), it is determined if the incremented value of i exceeds the maximum number of duplicate data items (524). If it is determined at step (524) that the incremented value of i does not exceed the maximum number of duplicate data items, n, the process returns to step (514) to start the calculation of the resulting utilization for the next identified duplicate data item. However, if it is determined at step (524) that the incremented value of i does exceed the maximum number of duplicate data items, n, then the calculation of the resulting utilization is completed.

Following the calculation of the resulting utilization outlined above for each identified duplicate data item in each tier in the hierarchy, the maximum $R_{i,j}$ is determined and assigned to the variable $X_i$ (526). In other words, the aggregation of calculations is evaluated and the one identified duplicate data item at one of the tiers in the hierarchy with the greatest measurement is selected. This selected measurement is employed in step (410) of FIG. 4. Accordingly, the identification and selection of the maximum $R_{i,j}$ is employed as a factor in selecting the duplicate data item to be retained as a master copy.

Figure 6:
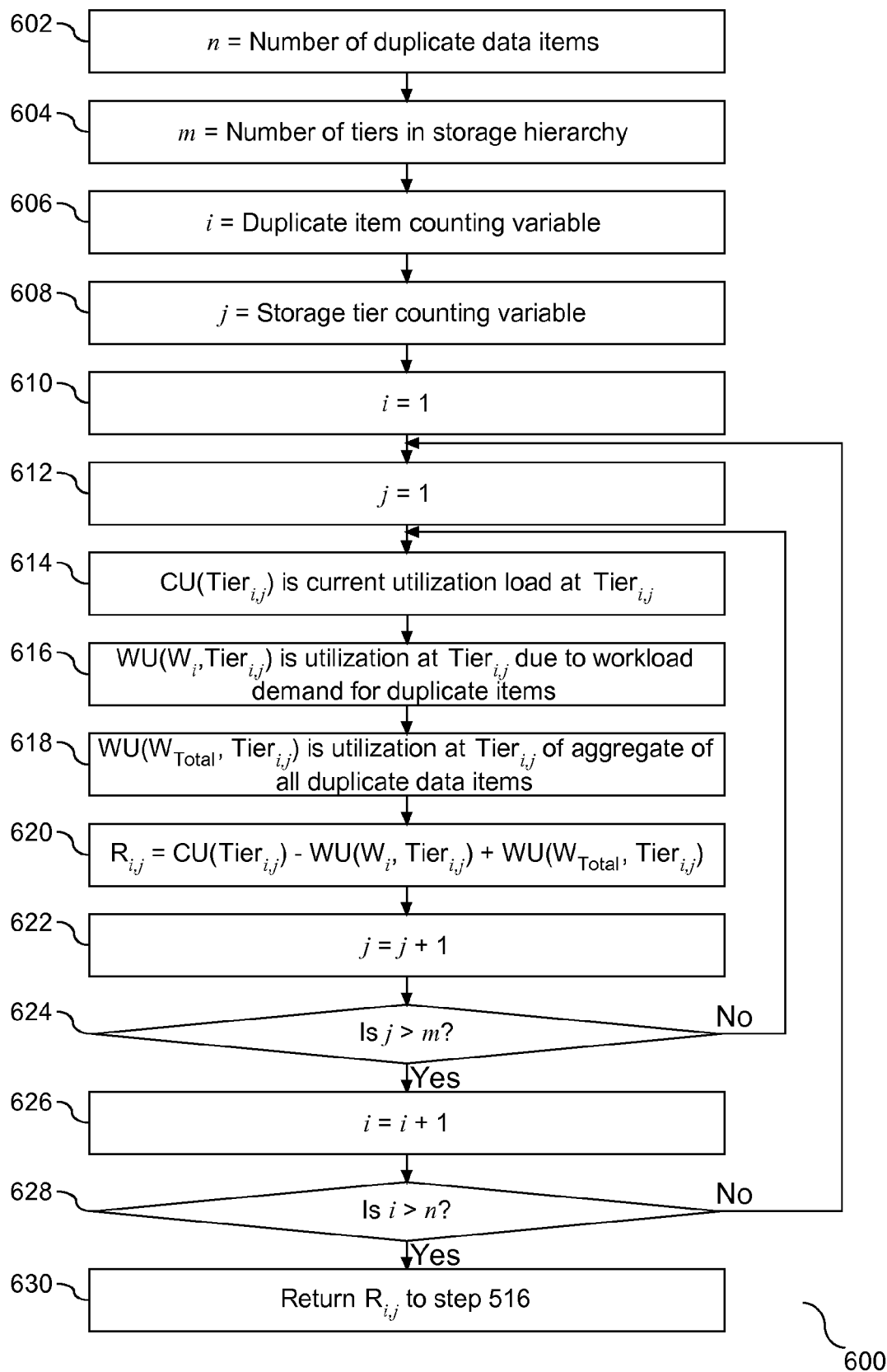
FIG. 6 is a flow chart illustrating the details of the resulting utilization calculation.

As shown as step (518), there is a requirement to compute the resulting utilization of the identified duplicate data item on each tier of the hierarchy. FIG. 6 is a flow chart (600)

illustrating the details of the calculation of the above-noted resulting utilization. Similar to FIGS. 4 and 5, the letter n is employed to represent the number of identified duplicate data items (602), and the letter m is employed to represent the number of tiers in the storage hierarchy (604). The letter i is employed as a counting variable for the identified duplicate data items (606), and the letter j is employed as a counting variable for the tiers of the storage hierarchy (608). The letters i and j are both set to the integer one (610) and (612), respectively. At each tier in the storage network hierarchy, there is a tool that monitors utilization. The variable CU (Tier$_{i,j}$) is employed to denote the current utilization load at the hierarchy position Tier$_{i,j}$ in the storage hierarchy (614). The load itself is outside the scope of this invention and it obtained from a monitoring tool. The variable measured at step (614) is to determine the load on the node in the hierarchy in general. The variable WU (W$_i$, Tier$_{i,j}$) is employed to denote the utilization caused on the hierarchy position Tier$_{i,j}$ due to the workload demand W$_i$ for duplicate copy D$_i$ (616). The variable measured at step (616) is to determine the load on a specified position in the hierarchy based upon the identified duplicate data item. Following step (616), the variable WU (W$_{Total}$, Tier$_{i,j}$) is employed to denote the utilization on the hierarchy position based upon the aggregate of all of the identified duplicate data items (618). Based upon the measurements found at steps (614)-(618), the following mathematical formula is employed to identify the workload for each storage media based upon the hierarchical representation of the associated internal components of the storage media (620), as follows:

$$R_{(i,j)} = CU(\text{Tier}_{i,j}) - WU(W_i, \text{Tier}_{i,j}) + WU(W_{Total}, \text{Tier}_{i,j})$$

It is this value that is employed at step (516) in FIG. 5.

Following step (620), the variable j is incremented (622), followed by a determination as to whether the incremented j is greater than m (624). If the response to the determination at step (624) is negative, the process returns to step (614). Similarly, if the response to the determination at step (624) is positive, the variable i is incremented (626) followed by a determined as to whether the incremented i is greater than n (628). A negative response to the determination at step (628) is followed by a return to step (612). However, if the response to the determination at step (628) is positive, the resulting utilization computation is complete and returned to step (516) (630). Accordingly, the process of computing the resulting utilization is computed for each identified duplicate copy at each tier in the storage hierarchy.

As shown above, not every duplicate location can support the demand of a master copy. Each copy location in the storage network is evaluated to determine if the identified location can support the cumulative demand of a master copy. As shown at step (424), in one embodiment, a new copy of the data item is created as a new master copy and allocated to a new storage location. The new copy is created when none of the existing copy location has sufficient spare space to support the cumulative demand of a master copy, i.e. the demand of all copies put together. In one embodiment, this may occur when the load of one of the tiers in the storage hierarchy cannot manage the cumulative demand of a master copy. To accommodate the new master copy, a mechanism is employed to allocate a new location for the master copy among all available locations in the storage network. In one embodiment, the following factors are taken into consideration for the location of the new master copy: the current set of all storage locations in the storage network, the current utilizations in the tiers of the storage hierarchy; the size of the storage required for the master copy; the minimum and maximum volume sizes; and the new workload demand profile, including the number of I/Os per second, the average request size, the read-write ratio, sequential-random percentage, cache hit rate, etc. Based upon the factors outlined above, a storage location is selected for the new master copy to ensure that the workload demands are met without exceeding a performance threshold of any tier in the hierarchy. In one embodiment, prior to employing the new master copy, a simulation may be employed, including removal of all identified duplicate copies. This simulation enables the resources used by the duplicate copies to be simulated without the burden of the duplicate copies. If the simulation of the master copy meets performance demands, the new master copy is set for the designated location and all duplicate copies are removed from their respective locations. Accordingly, the new master copy together with the simulation indicates that the new master copy can accommodate the cumulative demands created by the removal of the duplicate copies.

Creating a new master copy involves copying data between locations, with which there is a cost. In one embodiment, the cost is proportional to the size of the content copied. Accordingly, there is a cost benefit analysis that may be considered to justify the creation of the new master copy instead of selecting an existing copy. For example, in one embodiment, if the amount of data to be copied is large, then a performance evaluation may need to be conducted to justify creation of a new master copy. There is a cost for employing an existing copy as a master copy, as well as a one time cost for creating a new master copy. Accordingly, the creation of a new master copy should ascertain whether the associated cost meet or exceeds the benefits associated therewith.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 7:
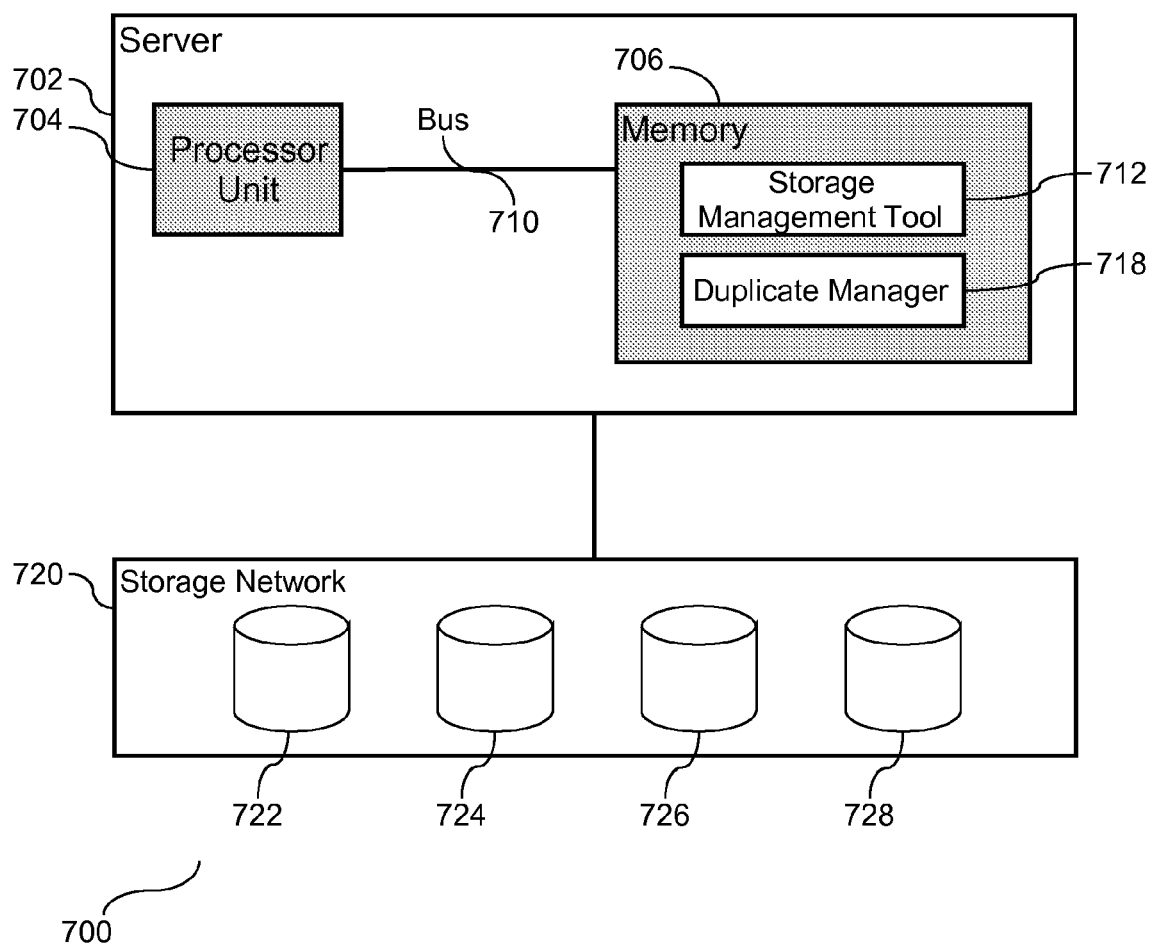
FIG. 7 is a block diagram illustrating placement of a duplicate copy tool in a computer system.

FIG. 7 is a block diagram (700) illustrating placement of duplicate copy tool in a computer system. The illustration shows a server (702) with a processor unit (704) coupled to memory (706) by a bus structure (710). Although only one processor unit (704) is shown, in one embodiment, the server (702) may include more processor units in an expanded design. As shown in FIG. 7, the server (702) is in communication with a storage network (720), which is shown herein with a plurality of storage pools (722), (724), (726), and (728). Although four storage pools (722)-(728) are shown herein, the invention should not be limited to the quantity of storage pools illustrated. In one embodiment, the storage network (720) may have a smaller quantity of storage pools or a greater quantity of storage pools.

A storage management tool (712) is shown residing in memory (606) of the server (702). The tool (712) functions to identify all duplicate copies of data in the storage network (720). Once duplicate copies of data have been identified, the tool (712) functions together with a duplicate manager (714), also residing in memory (706). The duplicate manager (714) selects a single copy from among the identified duplicate copies of data as a master copy, as described in detail in FIGS. 4-6 above. The duplicate manager (714) may utilize instructions in a computer readable medium to evaluate the cumulative demand on the storage network (720) for all of the identified duplicate copies, and to evaluate performance utilization of each of the identified duplicate copies. In one embodiment, the duplicate manager (714) may allocate a new storage location and copy one of the identified duplicate copies to the new storage location as a new master copy and remove all other identified duplicate copies in the storage network (720). Similarly, in one embodiment, the duplicate manager (714) may retain more than one copy of the identified duplication copies in response to identification of an insufficiency of the master copy to support demands of a single master copy.

Although the duplicate manager (714) is shown residing in memory, the invention should not be limited to this embodiment. In one embodiment, the duplicate manager (714) may reside as a hardware tool external to memory (706), or it may be implemented as a combination of hardware and software. Accordingly, the manager (714) may be implemented as a software tool or a hardware tool to facilitate mediation and management of operation of hardware memory devices.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Employment of a master copy together with removal of identified duplicate copies places a burden on the associated location of the master copy, as the master copy has to accommodate the cumulative demands of the previously identified duplicate copies. At the same time, removal of the duplicate data items creates space in the storage pool for additional data, as the redundancy associated with the duplicate copies is removed from the storage network. However, this invention is not limited to merely retaining one of the identified duplicate copies as a master copy with removal of all other identified duplicate copies. Rather, a mechanism is employed to intelligently select which identified duplicate copy should be retained as the master copy, with all other identified duplicate copies selected for removal. The intelligent selection mechanism evaluates the burden experienced by the storage system at each level in the storage hierarchy for each identified duplicate copy. At the same time, the mechanism evaluates the potential burden placed on the storage hierarchy by selection of an identified duplicate as a master copy. Only a selected master copy or a created master copy that meets a threshold set by the evaluations is selected as the new master copy, with all other identified duplicate copies removed from the storage system. Accordingly, identification and selection of a master copy includes an evaluation of the burden on the storage hierarchy to ensure that the selected master copy can accommodate the cumulative demands of the removed duplicate copies.

Alternative Embodiments

It will be appreciated that, although specific embodiments of the invention have been described herein for purposes of illustration, various modifications may be made without departing from the spirit and scope of the invention. In particular, it may be determined that among a set of identified duplicate copies, no single master copy can handle the demands for utilizing the data. Under such circumstances, more than one copy of the identified duplicate copies may be retained, with the remaining duplicate copies removed from storage. There may be various circumstances that require more than one master copy, including burdens associated with physical connectivity and other restrictions on the associated storage network. Accordingly, the scope of protection of this invention is limited only by the following claims and their equivalents.

We claim:

1. A method of selecting data for de-duplication, comprising:
   providing a processor in communication with a network storage system, the storage system having a hierarchical structure of components of a storage subsystem;
   identifying by the processor duplicate copies of data stored at multiple locations in said storage system;
   calculating utilization for each identified duplicate copy, the utilization including a measurement of load of each duplicate copy on each level in the structure;
   identifying and selecting a single copy from the identified duplicate copies, the selected copy having a maximum workload; and
   retaining the selected copy as a master copy.

2. The method of claim 1, wherein retaining the selected single copy of said duplicate copies includes determining the master copy has a measured resulting utilization below a defined threshold.

3. The method of claim 1, further comprising removing each of said identified duplication copies from storage following the step of retaining a single copy as a master copy.

4. The method of claim 1, further comprising allocating a new storage location and copying one of said duplicate copies to said new storage location as a new master copy and removing all other identified duplicate copies in said storage system.

5. The method of claim 1, further comprising retaining more than one copy of said identified duplication copies responsive to a dynamic storage management tool identifying insufficiency of said master copy to support demands of said single master copy.

6. The method of claim 1, wherein the step of interfacing with a dynamic storage management tool includes evaluating a load of the identified duplication copies and the selected master copy on internal components of a storage system.

7. A computer system, comprising:
a processor in communication with memory;
at least two storage pools in communication with said processor, the storage pools having a hierarchical structure of components of a storage subsystem;
a storage management tool to identify duplicate copies of data in the storage pools at multiple locations in the storage subsystem;
for each identified copy, calculation of a utilization, the utilization including a measurement of load of each duplicate copy on each level in the structure;
a duplicate manager in communication with said storage management tool, the duplicate manager to identify and select a single copy from the identified duplicate copies, the selected copy having a maximum workload; and
retention of the selected copy as a master copy.

8. The computer system of claim 7, wherein the duplicate manager determines said master copy has a measured utilization below a defined threshold.

9. The computer system of claim 7, further comprising said storage management tool to remove each of said identified duplication copies from storage following the duplicate manager retention of a single copy as a master copy.

10. The computer system of claim 7, further comprising said duplicate manager to allocate a new storage location and copy one of said duplicate copies to said new storage location as a new master copy and remove all other identified duplicate copies in said storage system.

11. The computer system of claim 10, further comprising said duplicate manager to retain more than one copy of said identified duplication copies responsive to said storage management tool identification of insufficiency of said master copy to support demands of said single master copy.

12. The computer system of claim 7, wherein the duplicate manager evaluates a load of the identified duplication copies and the selected master copy on internal components of a storage system of the storage pools.

13. An article comprising:
a computer readable data storage media including computer program instructions configured to manage duplicate copies of data, the instructions comprising:
instructions to identify all duplicate copies of data within a network storage system, the storage system having a hierarchical structure of components of the storage system;
for each identified copy, instructions to calculate utilization, the utilization including a measurement of load of each duplicate copy on each level in the structure;
identify and select a single copy from the identified duplicate copies, the selected copy having a maximum workload; and
instructions to retain the selected copy as a master copy.

14. The article of claim 13, wherein the instructions to retain a single copy of said duplicate copies includes determining said master copy has a measured utilization below a defined threshold.

15. The article of claim 13, further comprising instructions to remove each of said identified duplication copies from storage following retention of a single copy as a master copy.

16. The article of claim 13, further comprising instructions to allocate a new storage location and copy one of said duplicate copies to said new storage location as a new master copy and removing all other identified duplicate copies in said storage system.

17. The article of claim 16, further comprising instructions to retaining more than one copy of said identified duplication copies responsive to identifying an insufficiency of said master copy to support demands of said single master copy.

18. The article of claim 13, wherein the instructions to interface with a dynamic storage management tool includes evaluation of a load of the identified duplication copies and the selected master copy on internal components of a storage system.

19. The method of claim 1, further comprising selecting a storage pool for the master copy, the selection having a minimum calculated load.

20. The computer system of claim 7, further comprising selection of a storage pool for the master copy, the selection having a minimum calculated load.

* * * * *